M. NIELL.
PHOTOGRAPHIC ROLL FILM SPOOL.
APPLICATION FILED SEPT. 5, 1919.
1,423,355.
Patented July 18, 1922.
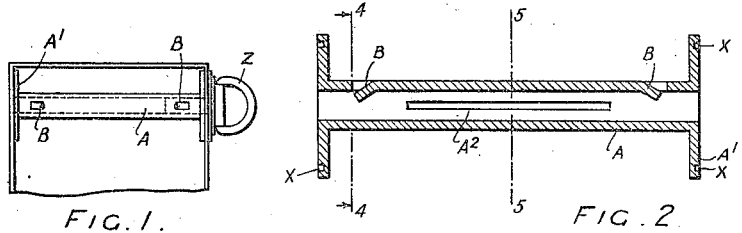
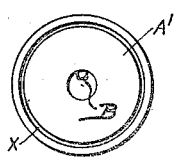
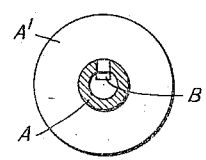
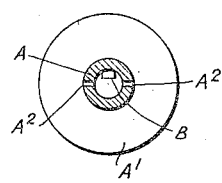
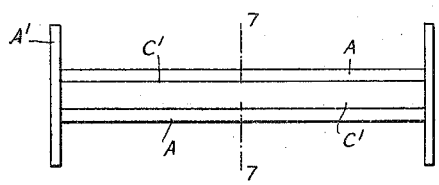
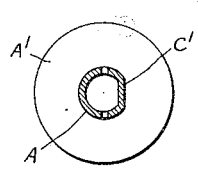
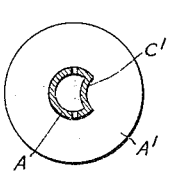
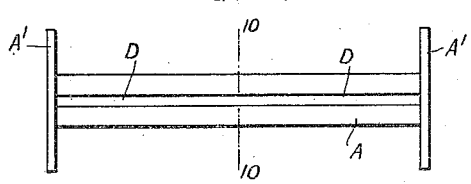
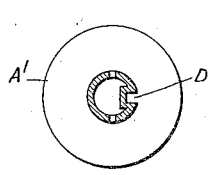
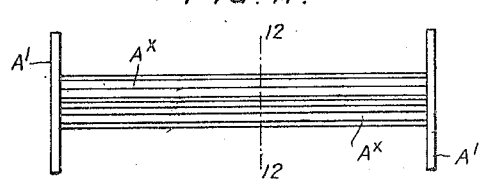
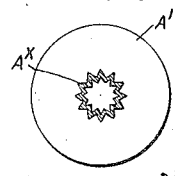
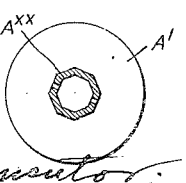

UNITED STATES PATENT OFFICE.

MAGNUS NIÉLL, OF STOCKHOLM, SWEDEN.

PHOTOGRAPHIC-ROLL-FILM SPOOL.

1,423,355.  Specification of Letters Patent.  Patented July 18, 1922.

Application filed September 5, 1919. Serial No. 321,932.

*To all whom it may concern:*

Be it known that I, MAGNUS NIÉLL, engineer, a subject of the King of Sweden, residing at 54 Kungsgatan, Stockholm, Sweden, have invented certain new and useful Improvements Relating to Photographic-Roll-Film Spools, of which the following is a specification.

This invention refers to spools for photographic cameras and winding keys therefor.

It is of course well-known that such spools constructed of wood or metal have heretofore been provided with means at the end thereof adapted to be engaged by the winding key of a camera to thereby enable the spool to be rotated when required to wind the photographic film thereon; such means on the spool end having usually been a cross-cut in the wooden end, or when the spool is provided with a metal shaft or projecting metal ends (like trunnions) the ends of these have been provided with a cross cut; and the winding key carried on the camera has been provided with a blade or part adapted to engage in said cross-cut to rotate the spool.

In such ordinary previous constructions it has been possible to use any such spool in any camera of a size adapted to receive same having such known kind of winding key.

Now it is one of the objects of the present invention to provide a special winding key on the camera and special winding means on the spool; so that on the one hand such spools with special winding means thereon according to this invention cannot be employed in any other cameras than those provided with the said special winding key and so that on the other hand such cameras fitted with such special winding keys cannot be used for any other spools than those having the said special winding means thereon; and my present invention comprises other features and details as hereinafter set forth.

In carrying out my present invention I form the spool of metal or any other suitable material adapted for my purpose; but I will describe my invention as carried out in metal such as brass.

The metal spool is formed with a hollow shaft and a disc or flange at each end of said hollow shaft which latter is or may be provided with a slit therein through which the end of the film can be inserted and the film wound on said shaft between said end discs thereon in the usual or any suitable manner.

At one or both ends of the metal spool according to my present invention I form the inside of the said hollow shaft other than cylindrical; and I provide a part on the winding key of the camera as a counterpart adapted to fit or engage in said special shaped hollow end of the spool shaft and to rotate said spool when the winding key is turned.

My present invention may be carried into practice as follows:—

The hollow shaft may be cylindrical interiorly and exteriorly, and have an indent or depression formed from the exterior (at one or both ends) whereby a tooth or indent is formed projecting into the bore of the shaft—or I may insert a screw or pin through the cylindrical wall of the hollow shaft to thus project into the bore of the shaft—and I form a recess or counterpart on the winding key to thus engage said indent pin or tooth.

Or I may form a flat or irregular part at one or more points around said bore and a counter-part on the key; or I may form polygonal flats all around said bore and a counterpart on the key; or I may form said hollow shaft corrugated all round, and a corrugated counterpart on the key.

Such indent, flats or corrugations, etc., may either be local at the end of the hollow shaft or may extend from end to end of the latter.

Instead of making the shaft hollow as aforesaid; said shaft may be made solid and provided with a slit there-through for the end of the film and made hollow or recessed at the ends only and such hollow ends or end recesses formed or provided with said special means as described with reference to the hollow shaft.

If made of any mouldable or compressible material then such spool could have these special shapes etc. formed therein by moulding or pressing.

According to a further part of my present invention the outside of each said end flange or disc, near its outside edge, is provided with a circular groove therein or with an overhanging edge or equivalent (to form a "nail-cut") to enable the ends of the spool to be gripped by the finger nails to lift the spool out of its receptacle in the camera.

My present invention is illustrated in the accompanying drawings in which:—

Fig. 1 is a local view of the winding key end of a photographic camera—with the cover of the latter removed—and showing fitted therein a photographic roll film spool according to this invention; and showing the winding key in engagement therewith.

Fig. 2 is a longitudinal sectional view of the spool shown in Fig. 1, but on a greatly enlarged scale, showing one construction of the spool.

Fig. 3 is an end view of Fig. 2.

Fig. 4 is a cross-sectional view on the line 4—4 Fig. 2; and Fig. 5 is a cross-sectional view on the line 5—5 Fig. 2.

Fig. 6 is similar view to Fig. 2 showing another construction of the spool and Fig. 7 is cross-sectional view on line 7—7 Fig. 6.

Fig. 8 is similar view to Fig. 7 but showing a slight modification of the construction shown in Figs. 6 and 7.

Figs. 9 and 10 are corresponding views to Figs. 6 and 7 showing an alternative construction.

Figs. 11 and 12 are similar views to Figs. 6 and 7 respectively, showing another alternative construction; and Fig. 13 is corresponding view to Fig. 12 but showing another modification.

In the construction illustrated in Figs. 1 to 5:—

A is the hollow shaft of the metal spool, having a disc or flange $A^1$ at each end thereof, and a slit $A^2$ through said hollow shaft A in the usual manner.

B is indent or tooth formed near each end of the shaft from the substance of the shaft, and integrally therewith, by cutting and depressing a portion B of said hollow shaft so as to project into the bore of said hollow shaft; the inner end of the winding key Z being formed circular to fit in said bore and such circular end formed with a depression or cut away portion corresponding to said tooth or indent B to thereby engage the latter and rotate the spool when said winding key is turned to wind the roll-film on said spool.

In the construction shown in Figs. 6 and 7; the hollow shaft A is formed with a flat portion C extending throughout the length of said shaft. Said flat C may be only local at each end of the shaft or if desired said flattened portion C may be other than quite flat. For example same may be curved or depressed in the centre as shown at $C^1$ in Fig. 8 or a longitudinal depression of channel form D may be formed in the hollow shaft A as shown in Figs. 9 and 10.

In the construction shown in Figs. 10 and 11; the hollow shaft $A^x$ is longitudinally corrugated or fluted lengthwise thereof—thus forming a fluted or corrugated interior of the bore; or, as shown in Fig. 13, the shaft $A^{xx}$ may be formed with flattened portions all round same for example octagonal as shown.

X., Figs. 2 and 3, is circular groove on the outside of each end disc $A^1$ to form a "nail cut" or means to enable the spool, when in the camera, to be gripped by the finger nails to lift same out of the camera.

What I claim is:—

1. A spool of the character described comprising a hollow shaft, heads extending angularly from the shaft and provided with grooves in their outer faces near the margins thereof, said shaft adapted to receive a key in the end portion thereof and having a formation adapted to cooperate with the key to form an interlock between key and spool.

2. A spool of the character described comprising a hollow shaft made in one piece with open ends and of a generally cylindrical exterior and interior with heads extending in planes at substantially right angles to the axis of the tubular shaft and provided with grooves in their outer faces near the margins thereof, said shaft and heads being made in one piece and the shaft being in one piece of sheet metal throughout, said hollow shaft having near both ends thereof portions of the sheet metal thereof pressed inwardly into the space embraced by the shaft and adapted to form projections to cooperate with similar formations on a key insertable into the open ends of the shaft for forming an interlock between key and spool.

3. A spool of the character described comprising a hollow shaft made in one piece of sheet material with open ends and of generally cylindrical exterior and interior with heads extending in planes at substantially right angles to the axis of the tubular shaft, said hollow shaft having near both ends thereof portions of the sheet material thereof pressed inwardly into the space embraced by the shaft and adapted to form projections to cooperate with similar formations on a key insertable into the open ends of the shaft for forming an interlock between key and spool.

MAGNUS NIÉLL.